UNITED STATES PATENT OFFICE.

ROBERT A. CHESEBROUGH, OF NEW YORK, N. Y.

IMPROVEMENT IN PRODUCTS FROM PETROLEUM.

Specification forming part of Letters Patent No. 127,568, dated June 4, 1872.

*To all whom it may concern:*

Be it known that I, ROBERT A. CHESEBROUGH, of the city, county, and State of New York, have invented a new and useful Product from Petroleum, which I have named "Vaseline;" and I do hereby declare that the following is a full, clear, and exact description thereof, which will enable those skilled in the art to make and use the same.

The substance from which vaseline is made is the residuum of petroleum left in the still after the greater part of the petroleum has been distilled off. Distillation is now conducted in two ways—first, by applying to the still sufficient heat to vaporize all the oil therein down to the residuum; and second, by distilling under a vacuum, according to what is known as the "vacuum" process, by which less heat is required than in the ordinary way. The residuum left in the still by the vacuum process is greater in amount and better in quality than that produced by the old method, owing to its having been subjected to much less heat and to not having been run down so low in the still. The residuum produced by the vacuum process makes, therefore, a better quality of vaseline than that produced by the old process, and is more easily and cheaply refined by filtration through bone-black, but the products from both are identical in properties and appearance.

My method of making vaseline is by filtering the aforesaid petroleum residuums through bone-black, according to my process described in my Letters Patent dated August 22, 1865, and numbered 49,502, preferring to use in said process my steam-filter patented by me August 8, 1865, numbered 49,230, and preferring also to use bone-black, prepared as described in my patent dated July 10, 1866, numbered 56,179; although I do not confine myself to the use of the said improved filter or prepared bone-black.

Vaseline is the product of the filtration of the said residuums through bone-black, and varies in color as it comes from the filter. First it is a pure white at the beginning of the operation, soon changing to a light straw, then to a dark straw, and then to a deep claret at the close of the operation, the amounts of the several colors varying somewhat, according to the quality of the residuum, the quality, fineness, and preparation of the bone-black, and the skill of the manipulator in charging the filters and properly heating them.

Vaseline is a thick, oily, pasty substance; is semi-solid in appearance, unobjectionable in odor, becomes fluid at temperatures varying from 85° to 110° Fahrenheit, and, when fluid, is transparent. It will not saponify, does not crystallize, and does not contain paraffine, and in this respect essentially differs from the heavy products of petroleum which have been subjected to destructive distillation, and which are known as paraffine-oils.

When paraffine-oil is filtered by my process the result is a better article of paraffine-oil, and not vaseline. It will, therefore, be seen that vaseline cannot be made from any of the distilled products of petroleum, but only from the residuums of the still which have not been vaporized; and hence it is a distinct substance by itself, is a new article of manufacture, and is useful for various purposes.

Vaseline is especially useful in currying, stuffing, and oiling all kinds of leather. It is also a good lubricator, and may be used to great advantage on all kinds of machinery. The finest grade of vaseline is also adapted to use as a pomade for the hair, and will be found excellent for that purpose, one of its chief recommendations being that it does not oxidize. It is also an excellent substance for glycerine-cream for chapped hands, &c., which it resembles closely in touch and somewhat in appearance. Its gravity varies from 20° to 34° Baumé, according to the gravity of the crude vacuum or other residuum used in its production.

*Claim.*

What I claim as my invention, and desire to secure by Letters Patent, is—

The new article of manufacture named by me "Vaseline," substantially as herein described.

ROBT. A. CHESEBROUGH.

Witnesses:
CHAS. DRAKE,
JOHN TREDWELL.